United States Patent
Rahat et al.

(10) Patent No.: US 12,511,844 B2
(45) Date of Patent: Dec. 30, 2025

(54) WEARABLE DEVICE AND CONTROLLING METHOD THEREOF

(71) Applicant: Samsung Electronics Co., Ltd., Suwon-si (KR)

(72) Inventors: Imran Khan Rahat, Dacca (BD); Anirudha Paul, Dacca (BD); Akib Jawad Nafis, Dacca (BD)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 18/470,096

(22) Filed: Sep. 19, 2023

(65) Prior Publication Data

US 2024/0005616 A1    Jan. 4, 2024

Related U.S. Application Data

(63) Continuation of application No. PCT/KR2022/005531, filed on Apr. 18, 2022.

(30) Foreign Application Priority Data

Jun. 18, 2021   (KR) .......................... 10-2021-0079625

(51) Int. Cl.
    *G06T 19/00*    (2011.01)
(52) U.S. Cl.
    CPC .................. *G06T 19/006* (2013.01)
(58) Field of Classification Search
    CPC ........ G06T 19/006; G06F 3/011; G06F 3/165; G06F 2203/011; G06F 1/163; H04W 4/02; G06N 3/08; G02B 27/017
    See application file for complete search history.

(56) References Cited

U.S. PATENT DOCUMENTS

| 7,933,945 B2 | 4/2011 | Krzyzanowski et al. |
| 9,535,248 B2 | 1/2017 | Hirabayashi et al. |

(Continued)

FOREIGN PATENT DOCUMENTS

| JP | 2015041969 A | 3/2015 |
| KR | 20090106149 A | 10/2009 |

(Continued)

OTHER PUBLICATIONS

Korean Rejection Decision issued Jul. 4, 2024 in corresponding Korean Patent Application No. 10-2021-0079625.

(Continued)

*Primary Examiner* — Chante E Harrison
(74) *Attorney, Agent, or Firm* — NIXON & VANDERHYE P.C.

(57) ABSTRACT

A wearable device is disclosed. The wearable device may comprise: a display; a first sensor; a second sensor; a communication interface comprising communication circuitry; and a processor. The processor may be configured to: provide augmented reality (AR) content through the display; identify a control mode for a viewing environment of the AR content based on biometric information obtained through the first sensor, and surrounding environment information obtained through the second sensor; acquire control information on at least one external device related to the viewing environment based on the identified control mode; and transmit a control signal for controlling at least one external device to the external device through a communication interface based on the acquired control information.

13 Claims, 16 Drawing Sheets

(56) References Cited

U.S. PATENT DOCUMENTS

| | | | |
|---|---|---|---|
| 10,464,570 B2 | 11/2019 | Cho et al. | |
| 10,466,726 B2 | 11/2019 | Kwak et al. | |
| 11,120,630 B2* | 9/2021 | Choi | G06F 3/011 |
| 2012/0194419 A1 | 8/2012 | Osterhout et al. | |
| 2017/0185276 A1* | 6/2017 | Lee | G06F 3/04847 |
| 2018/0329662 A1* | 11/2018 | Cronin | G02B 27/017 |
| 2018/0369847 A1 | 12/2018 | Kihm et al. | |
| 2019/0129176 A1 | 5/2019 | Endo et al. | |
| 2019/0129607 A1* | 5/2019 | Saurabh | G06F 3/011 |

FOREIGN PATENT DOCUMENTS

| | | | |
|---|---|---|---|
| KR | 10-2011-0128213 | | 11/2011 |
| KR | 20120043848 A | | 5/2012 |
| KR | 101632401 B1 | | 6/2016 |
| KR | 20170068205 A | | 6/2017 |
| KR | 20170103706 A | | 9/2017 |
| KR | 20170114804 A | | 10/2017 |
| KR | 20180020497 A | | 2/2018 |
| KR | 20180102870 A | * | 9/2018 |
| KR | 20200107395 A | | 9/2020 |
| KR | 102176369 B1 | | 11/2020 |
| WO | 2018128475 A1 | | 7/2018 |

OTHER PUBLICATIONS

Rejection Decision dated Feb. 27, 2024 issued by the Korean Patent Office for Korean Patent Application No. 10-2021-0079625.

Facebook's Prototype VR Face Tracking Got Even Better, Online: https://www.youtube.com/watch?v=v3XcQtoja_Y, Jun. 28, 2019, 1 page.

Jo et al., AR Enabled IoT for a Smart and Interactive Environment: A Survey and Future Directions, Online: https://www.mdpi.com/1424-8220/19/19/4330, Published Oct. 7, 2019, 17 pages, Sensors.

Lin et al., Eye Movement and Pupil Size Constriction Under Discomfort Glare, Article in Investigative Opthalmology & Visual Science, Jan. 2015, 9 pages, Research Gate.

International Search Report for PCT/KR2022/005531 mailed Jul. 15, 2022, 6 pages.

Written Opinion of the ISA for PCT/KR2022/005531 mailed Jul. 15, 2022, 4 pages.

* cited by examiner

FIG. 8A

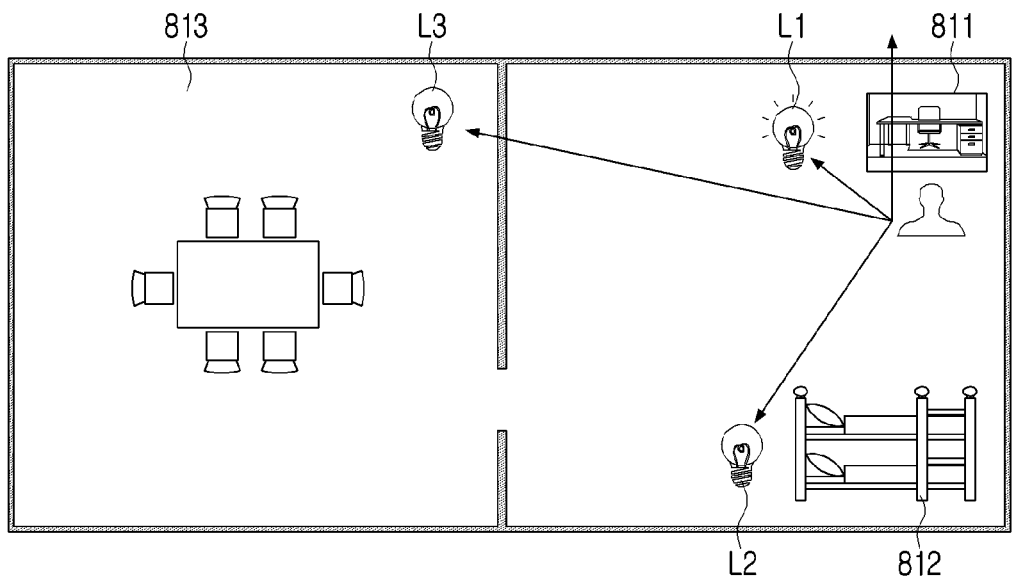

| LIGHTING DEVICE | DATA INCLUDING LOCATION INFORMATION OF AN EXTERNAL DEVICE | RELEVANCE WITH THE VIEWING ENVIRONMENT |
|---|---|---|
| ACTIVITY DETECTED: READING A BOOK | | |
| L1 | DISTANCE FROM THE USER: 1 METER<br>POWER: 40 WATT<br>DIRECT VISIBLE RAY: YES<br>VECTOR LOCATION FROM THE AR: 55° | YES |
| L2 | DISTANCE FROM THE USER: 10 Meter<br>POWER: 40 Watt<br>DIRECT VISIBLE RAY: Yes<br>VECTOR LOCATION FROM THE AR: -5° | NO |
| L3 | DISTANCE FROM THE USER: 10 METER<br>POWER: 40 WATT<br>DIRECT VISIBLE RAY: NO<br>VECTOR LOCATION FROM THE AR: 35° | NO |

FIG. 8B

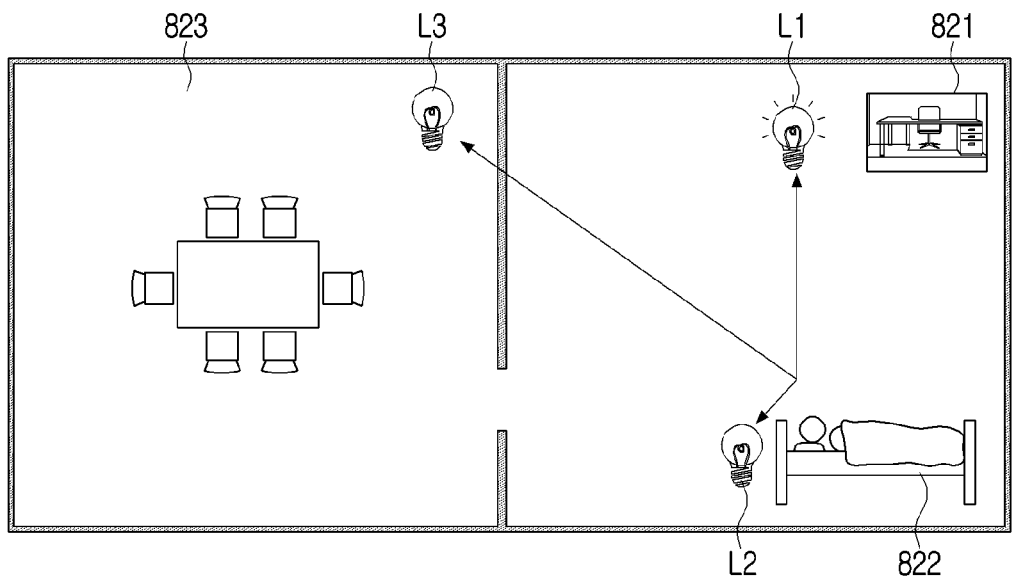

| LIGHTING DEVICE | DATA INCLUDING LOCATION INFORMATION OF AN EXTERNAL DEVICE | RELEVANCE WITH THE VIEWING ENVIRONMENT |
|---|---|---|
| ACTIVITY DETECTED: SLEEPING | | |
| L1 | DISTANCE FROM THE USER: 10 METER<br>POWER: 40 WATT<br>DIRECT VISIBLE RAY: YES<br>VECTOR LOCATION FROM THE AR: 85° | YES |
| L2 | DISTANCE FROM THE USER: 1 METER<br>POWER: 40 WATT<br>DIRECT VISIBLE RAY: YES<br>VECTOR LOCATION FROM THE AR: 65° | YES |
| L3 | DISTANCE FROM THE USER: 10 METER<br>POWER: 40 WATT<br>DIRECT VISIBLE RAY: NO<br>VECTOR LOCATION FROM THE AR: 2° | NO |

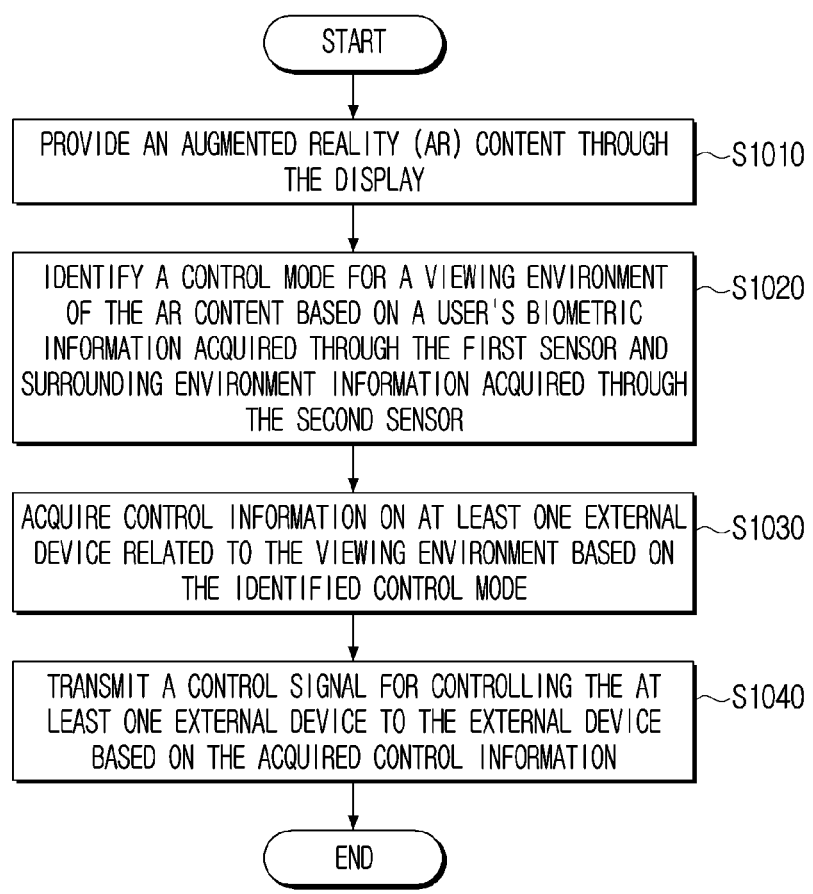

WEARABLE DEVICE AND CONTROLLING METHOD THEREOF

CROSS-REFERENCE TO RELATED APPLICATIONS

This application is a continuation of International Application No. PCT/KR2022/005531 designating the United States, filed on Apr. 18, 2022, in the Korean Intellectual Property Receiving Office and claiming priority to Korean Patent Application No. 10-2021-0079625, filed on Jun. 18, 2021, in the Korean Intellectual Property Office, the disclosures of each of which are incorporated by reference herein in their entireties.

BACKGROUND

Field

The disclosure relates to a wearable device providing an augmented reality (AR) content, and a controlling method thereof.

Description of Related Art

Recently, research on a method of controlling an electronic device used in an indoor space is actively going on. In particular, recently, a technology of controlling an electronic device located indoors utilizing a mobile terminal device or a wearable device has become commercialized, but there is inconvenience that a user has to input an instruction for controlling an electronic device.

Accordingly, there has been a continuous demand for a method of controlling an electronic device located indoors without a user's intervention.

SUMMARY

The disclosure addresses the aforementioned need, and embodiments of the disclosure provide a wearable device that controls an external device according to control information identified based on sensing data acquired through a plurality of sensors, and a controlling method thereof.

A wearable device according to various example embodiments of the disclosure may include: a display, a first sensor, a second sensor, a communication interface including communication circuitry, and a processor configured to: provide an augmented reality (AR) content through the display, identify a control mode for a viewing environment of the AR content based on biometric information acquired through the first sensor and surrounding environment information acquired through the second sensor, acquire control information on at least one external device related to the viewing environment based on the identified control mode, and transmit a control signal for controlling the at least one external device to the external device through the communication interface based on the acquired control information.

The wearable device according to various example embodiments may further include: a memory storing profile information, wherein the processor may be further configured to identify the control mode for the viewing environment of the AR content based on the biometric information, the surrounding environment information, and the stored profile information.

According to various example embodiments, the processor may be further configured to: control the display to provide a user interface (UI) configured to guide control of the at least one external device based on the acquired control information, and based on an instruction for controlling the at least one external device being input through the UI, transmit the control signal for controlling the at least one external device to the external device through the communication interface.

According to various example embodiments, the UI may include at least one of type information of the at least one external device, control time information for the at least one external device, or request information on the control authority for the at least one external device.

According to various example embodiments, the information on the control mode for the viewing environment of the AR content may be acquired by inputting the biometric information and the surrounding environment information into a first neural network model, wherein the first neural network model may have been trained to receive input of the biometric information and the surrounding environment information and output control recommendation information for each of a plurality of environmental elements.

According to various example embodiments, the wearable device may further include: a third sensor, wherein the processor may be further configured to: acquire motion information and information on an external object related to the AR content through the third sensor, and identify the control mode for the viewing environment of the AR content based on the biometric information, the surrounding environment information, the motion information, and the information on the external object.

According to various example embodiments, the processor may be further configured to: input the biometric information into a second neural network model and acquire the preference information, input the motion information and the information on the external object into a third neural network model and acquire activity information related to the AR content, and identify the control mode for the viewing environment of the AR content based on the preference information, the activity information, and the surrounding environment information.

According to various example embodiments, the processor may be further configured to identify the at least one external device related to the viewing environment based on location information of each of a plurality of external devices and location information of the wearable device.

According to various example embodiments, the communication interface may include an ultra wide band (UWB) communication chip including UWB circuitry, and the processor may be further configured to identify the external device by a UWB method.

According to various example embodiments, the control mode may include at least one of a concentration mode, a relax mode, or a power saving mode.

According to various example embodiments, a method of operating a wearable device according to various example embodiments of the disclosure may include: providing an augmented reality (AR) content through a display, identifying a control mode for a viewing environment of the AR content based on biometric information acquired through a first sensor and surrounding environment information acquired through a second sensor, acquiring control information on at least one external device related to the viewing environment based on the identified control mode, and transmitting a control signal for controlling the at least one external device to the external device based on the acquired control information.

According to various example embodiments, in the identifying the control mode, the control mode for the viewing environment of the AR content may be identified based on the biometric information, the surrounding environment information, and the user profile information.

According to various example embodiments, in the transmitting the control signal, a user interface (UI) configured to guide control of the at least one external device based on the acquired control information may be provided, and based on an instruction for controlling the at least one external device being input through the UI, the control signal for controlling the at least one external device may be transmitted to the external device.

According to various example embodiments, the UI may include at least one of type information of the at least one external device, control time information for the at least one external device, or request information on the control authority for the at least one external device.

According to various example embodiments, the information on the control mode for the viewing environment of the AR content may be acquired by inputting the biometric information and the surrounding environment information into a first neural network model, wherein the first neural network model may have been trained to receive input of the biometric information and the surrounding environment information and output control recommendation information for each of a plurality of environmental elements.

According to various example embodiments of the disclosure, a wearable device can control an electronic device located indoors without a user's intervention, and thus user convenience is improved.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 8A and FIG. 8B are diagrams illustrating an example control method based on location information according to various embodiments;

FIG. 10 is a flowchart illustrating an example method of operating the electronic device according to various embodiments.

DETAILED DESCRIPTION

Hereinafter, the disclosure will be described in greater detail with reference to the accompanying drawings.

As terms used in the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, arbitrarily selected terms may be used, and in such cases, the meaning of the terms will be described in detail in the relevant descriptions in the disclosure. Accordingly, the terms used in the disclosure should be defined based on the meaning of the terms and the overall content of the disclosure, not just based on the names of the terms.

In the disclosure, expressions such as "have," "may have," "include," and "may include" denote the existence of such characteristics (e.g. elements such as numbers, functions, operations, and components), and do not exclude the existence of additional characteristics.

The expression "at least one of A and/or B" should be interpreted to mean any one of "A" or "B" or "A and B."

The expressions "first," "second," and the like used in the disclosure may be used to describe various elements regardless of any order and/or degree of importance. Such expressions may be used to distinguish one element from another element, and are not intended to limit the elements.

The description in the disclosure that one element (e.g. a first element) is "(operatively or communicatively) coupled with/to" or "connected to" another element (e.g. a second element) should be interpreted to include both the case where the one element is directly coupled to the another element, and the case where the one element is coupled to the another element through still another element (e.g. a third element).

Singular expressions include plural expressions, unless defined obviously differently in the context. In the disclosure, terms such as "include" and "consist of" should be construed as designating that there are such characteristics, numbers, steps, operations, elements, components, or a combination thereof described in the disclosure, but not as excluding in advance the existence or possibility of adding one or more of other characteristics, numbers, steps, operations, elements, components, or a combination thereof.

In the disclosure, "a module" or "a part" performs at least one function or operation, and may be implemented as hardware or software, or as a combination of hardware and software. A plurality of "modules" or a plurality of "parts" may be integrated into at least one module and implemented as at least one processor (not shown), except "a module" or "a part" that needs to be implemented as specific hardware.

In the disclosure, the term "user" may refer to a person who uses a wearable device.

Figure 1:
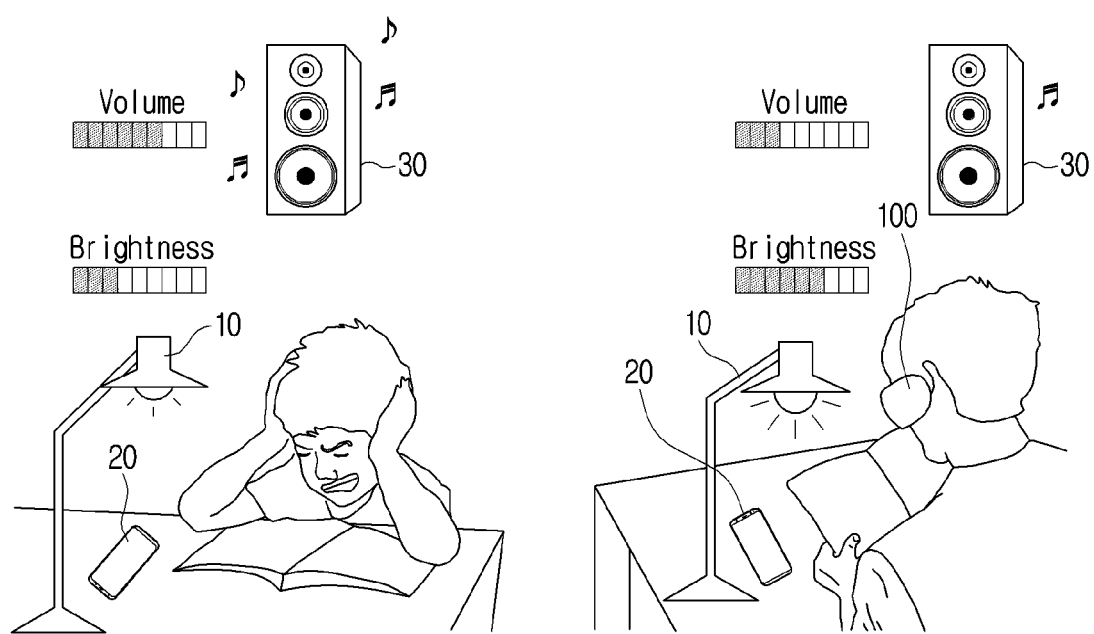
FIG. 1 is a diagram illustrating an example operation of a wearable device according to various embodiments.

FIG. 1 is a diagram illustrating an example operation of a wearable device according to various embodiments.

According to FIG. 1, a wearable device 100 according to various embodiments of the disclosure may control an electronic device located in an indoor space (referred to as an external device hereinafter). The wearable device 100 may include a plurality of sensors, and the wearable device 100 according to various embodiments may be implemented as AR glasses, a smart watch, etc., but is not limited thereto.

The at least one external device may be implemented as various devices that can provide Internet of Things (IoT) services. For example, the at least one external device may be implemented as various devices equipped with a communication function and a sensor function. For example, the at least one external device may be implemented as lighting devices such as a lamp, a blind, an illumination sensor, etc., acoustic devices such as a speaker, a microphone, etc., and air conditioning devices such as an air conditioner, a heater, a boiler, a temperature sensor, an air purifier, a humidifier, a humidity sensor, etc. However, these are merely an example, and the external device can be implemented in various forms such as a refrigerator, a washing machine, a monitor, a DVD player, a smartphone, a digital camera, an electronic frame, etc.

According to various embodiments, in an indoor space, a lighting device 10, a mobile device 20, and an acoustic device 30 may be located. Further, according to the type of a specific activity that a user performs, the environment of the indoor space appropriate for it may also vary. For example, in case the user reads a book, an environment wherein the lighting device 10 is dark, a notification is provided from the mobile device 20, or the volume of the acoustic device 30 is big may interfere with reading.

The wearable device 100 according to various embodiments may adjust the lighting device 10 located indoors to be bright, and the volume of the acoustic device 30 to be small, such that the environment becomes an environment appropriate for the activity (reading) performed by the user wearing the device. The wearable device 100 may perform control such that a notification is not provided from the mobile device 20 in order that the user's reading is not interfered.

For example, even if an instruction for controlling the external devices 10, 20, 30 is not separately input from the user, the wearable device 100 according to various embodiments may automatically control the external devices based on sensing data acquired through a plurality of sensors provided on the device 100.

Hereinafter, various embodiments wherein external devices can be controlled according to control information identified based on sensing data acquired through the plurality of sensors without a user's intervention will be described in greater detail.

Figure 2:
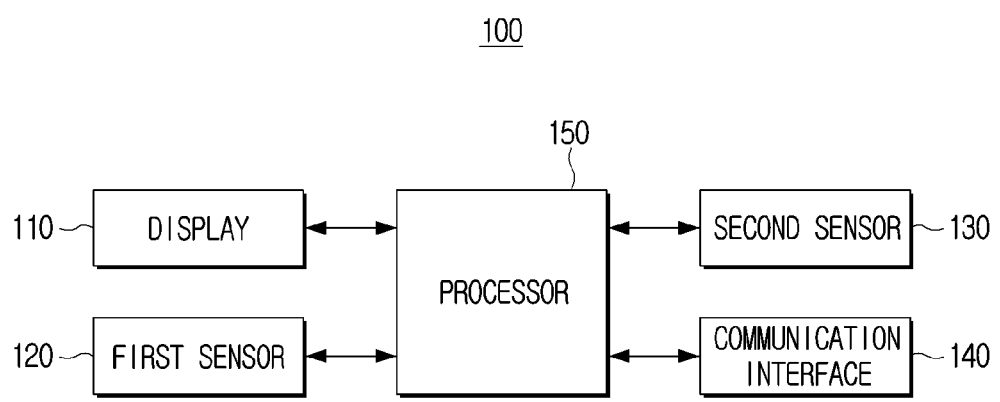
FIG. 2 is a block diagram illustrating an example configuration of a wearable device according to various embodiments.

FIG. 2 is a block diagram illustrating an example configuration of a wearable device according to various embodiments of the disclosure.

According to FIG. 2, the wearable device 100 may include a display 110, a first sensor 120, a second sensor 130, a communication interface (e.g., including communication circuitry) 140, and a processor (e.g., including processing circuitry) 150.

The display 110 may be implemented as displays in various forms such as, for example, and without limitation, a liquid crystal display (LCD), an organic light emitting diodes (OLED) display, a quantum dot light-emitting diodes (QLED) display, a plasma display panel (PDP), etc. Inside the display 110, a driving circuit that may be implemented in forms such as a TFT, a low temperature poly silicon (LTPS) TFT, an organic TFT (OTFT), etc., and a backlight unit, etc. may also be included together. Meanwhile, the display 110 may be implemented as a flexible display, a 3D display, etc.

The first sensor 120 may acquire sensing data regarding a user's biometric information. The first sensor 120 according to various embodiments may be implemented as at least one of an iris and pupil scanner, a facial scanner, a heart rate sensor, an electrocardiogram sensor, or a blood pressure sensor, but is not limited thereto.

The second sensor 130 may acquire sensing data regarding information other than a user's biometric information. The second sensor 130 according to various embodiments may acquire sensing data regarding the surrounding environment information. For this, the second sensor 130 may be implemented as at least one of a temperature sensor, a humidity sensor, an illumination sensor, or a harmful substance sensor, but is not limited thereto.

The communication interface 140 may include various communication circuitry and input and output various types of data. For example, the communication interface 140 may transmit and receive various types of data with an external device (e.g., a source device), an external storage medium (e.g., a USB memory), and an external server (e.g., a webhard) through communication methods such as AP-based Wi-Fi (Wi-Fi, a wireless LAN network), Bluetooth, Zigbee, a wired/wireless local area network (LAN), a wide area network (WAN), an Ethernet, the IEEE 1394, a high-definition multimedia interface (HDMI), a universal serial bus (USB), a mobile high-definition link (MHL), the Audio Engineering Society/European Broadcasting Union (AES/EBU), Optical, Coaxial, etc.

The processor 150 may include various processing circuitry and controls the overall operations of the wearable device 100. For example, the processor 150 may be connected with each component of the wearable device 100, and control the overall operations of the wearable device 100. For example, the processor 150 may be connected with the display 110, the first sensor 120, the second sensor 130, and the communication interface 140, and control the operations of the wearable device 100.

According to various embodiments, the processor 150 may be referred to as various names such as a digital signal processor (DSP), a microprocessor, a central processing unit (CPU), a micro controller unit (MCU), a micro processing unit (MPU), a neural processing unit (NPU), a controller, an application processor (AP), etc., but it will be described as the processor 150 in this disclosure.

The processor 150 may be implemented as a system on chip (SoC) and large scale integration (LSI), or in the form of a field programmable gate array (FPGA). Also, the processor 150 may include a volatile memory such as an SRAM, etc.

The processor 150 according to various embodiments of the disclosure may provide an augmented reality (AR) content through the display 110. Here, the AR content may be a content that synthesizes a virtual object into an actual environment and makes the object look like an object existing in reality, or additionally provides information necessary for an actual environment.

The processor 150 may identify a control mode for a viewing environment of the AR content based on a user's biometric information acquired through the first sensor 120 and surrounding environment information acquired through the second sensor 130. Here, the control mode for the viewing environment of the AR content (referred to as the control mode hereinafter) may be a mode related to an operation state of the external device appropriate for an activity that the user performs while viewing the AR content. The control mode according to various embodiments may include at least one of a concentration mode, a relax mode, or a power saving mode, but is not limited thereto.

Hereinafter, an operation of the wearable device 100 will be described based on the premise that the control mode for a viewing environment of an AR content and the control mode for at least one external device located in an indoor space have the same meaning.

According to an embodiment, in case the user performs an activity requiring concentration, the processor 150 may identify that the control mode is 'a concentration mode,' and control the external device based on the identified control mode. For example, the processor 150 may increase the illumination of the lighting device, decrease the volume of the acoustic device, and control the mobile device not to provide a notification in the concentration mode.

According to an embodiment, the processor 150 may identify an independent control mode for each of the at least one external device. For example, in case it is identified that the user is reading a book, the processor 150 may respectively control the lighting device in 'the concentration mode,' the acoustic device in 'the relax mode,' and the mobile device in 'the power saving mode.'

In the aforementioned example embodiments, it was described that the various implementation examples for prevention/reduction of intervention are separate embodiments, but the disclosure can be implemented in a form wherein at least some of these implementation examples are used complexly.

The processor 150 may acquire control information for at least one external device related to the viewing environment based on the identified control mode. Here, the processor 150 may control only an external device that can influence the viewing environment among the at least one external device located in the indoor space.

For example, in case the user is reading a book in a room, the processor 150 may acquire only control information for an external device located in the room among the indoor spaces, and may not acquire control information for external devices located in the living room.

The processor 150 may transmit a control signal for controlling the at least one external device based on the acquired control information to the external device through the communication interface 140.

The wearable device 100 may further include a memory storing user profile information. The processor 150 may identify the control mode for the viewing environment of the AR content based on the user's biometric information, the surrounding environment information, and the stored user profile information.

The user's profile information may include at least one of information related to the user's eyesight and hearing, whether the user has an underlying disease and the type of the disease, information on the user's sleeping pattern, or the user's use history information of the external device, but is not limited thereto.

The processor 150 may control the display 110 to provide a user interface (UI) guiding control of the at least one external device based on the acquired control information. In addition, if a user instruction for controlling the at least one external device is input through the UI, the processor 150 may transmit a control signal for controlling the at least one external device to the external device through the communication interface 140.

The UI may include at least one of type information of the at least one external device, control time information for the at least one external device, or request information on the control authority for the at least one external device.

The information on the control mode for the viewing environment of the AR content may be acquired by inputting the user's biometric information and the surrounding environment information into a first neural network model, and the first neural network model may be a model that has been trained to receive input of the user's biometric information and the surrounding environment information and output control recommendation information for each of a plurality of environmental elements.

The plurality of environmental elements may include at least one of 'the temperature,' 'the humidity,' 'the noise level,' 'the illumination,' or 'the concentration of harmful substances.' The processor 150 according to various embodiments may acquire information on control modes for controlling each of the at least one external device of different types based on control recommendation information for each of the plurality of environmental elements. The control recommendation information according to various embodiments may include information corresponding to 'decrease of the temperature,' 'decrease of the humidity,' 'decrease of the noise level,' 'increase of the illumination,' or 'decrease of the concentration of harmful substances,' but the disclosure is not limited thereto.

For example, in case the first neural network model output the control recommendation information corresponding to 'decrease of the temperature,' the wearable device 100 may acquire information regarding 'the concentration mode' of the air conditioning device, and control the air conditioning device such that the temperature of the indoor space is decreased based on the acquired information.

The wearable device 100 may further include a third sensor, and the processor 150 may acquire the user's motion information and information on an external object related to the AR content through the third sensor, and identify the control mode for the viewing environment of the AR content based on the user's biometric information, the surrounding environment information, the user's motion information, and the information on the external object.

The processor 150 may input the user's biometric information into the second neural network model, and acquire the user's preference information. The preference information according to various embodiments may be information regarding an emotion that a user feels about the surrounding environment. For example, the preference information regarding a user who is not satisfied with the surrounding environment may be 'low.' In contrast, the preference information regarding a user who is satisfied with the surrounding environment may be 'high.'

The processor 150 may input the user's motion information and the information on the external object into the third neural network model, and acquire activity information related to the AR content. Here, the activity information may be information related to at least one of the type, the intensity, or the duration time of the activity performed by the user, but is not limited thereto.

The processor 150 may identify the control mode for the viewing environment of the AR content based on the user's preference information, the activity information, and the surrounding environment information.

The processor 150 may identify the at least one external device related to the viewing environment based on the location information of each of a plurality of external devices and the location information of the wearable device.

The communication interface 140 may include an ultra wide band (UWB) communication chip, and the processor 150 may identify the at least one external device related to the viewing environment by a UWB method.

Figure 3A:
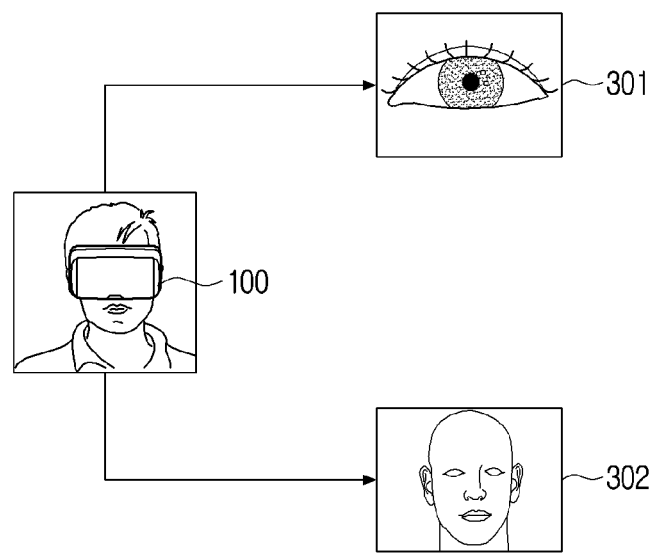
FIG. 3A and FIG. 3B are diagrams illustrating biometric information according to various embodiments.
Figure 3B:
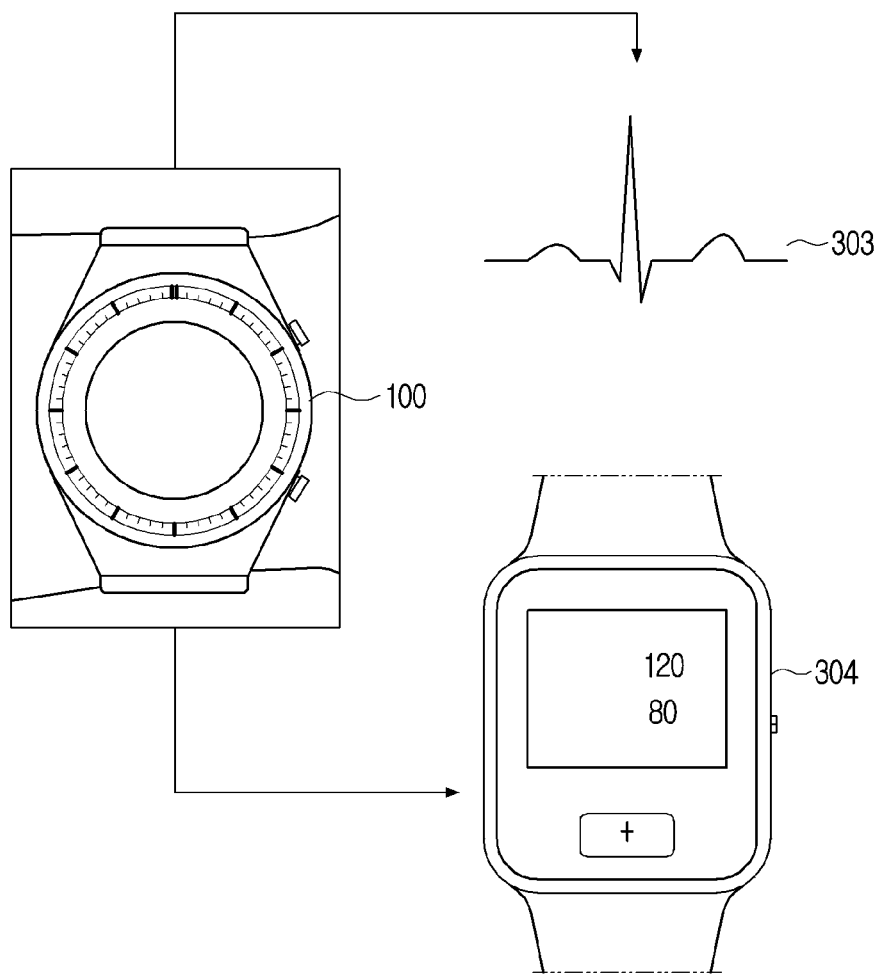

FIG. 3A and FIG. 3B are diagrams illustrating example biometric information according to various embodiments.

Referring to FIG. 3A, the wearable device 100 may be implemented as AR glasses. The first sensor 120 according to various embodiments may include at least one of an iris and pupil scanner and/or a facial scanner. The user's biometric information may include at least one of eye data 301 or facial expression data 302.

For example, the wearable device 100 may acquire the eye data 301 through the iris and pupil scanner. The eye data 301 according to various embodiments may be data related to at least one of the degree that the user's pupils are expanded, the cycle that the user blinks his or her eyes, or the degree that the user's eyes are bloodshot.

The wearable device 100 may acquire the facial expression data 302 through the facial scanner. The facial expression data 302 according to various embodiments may be data regarding the user's facial expressions. For example, the facial expression data 302 may include data related to at least one of 'frowning,' 'tiredness,' or 'expressionless,' but is not limited thereto.

The wearable device 100 according to various embodiments may identify that the user's pupils are expanded by greater than or equal to a threshold numerical value from the eye data 301, and determine that the user feels that the illumination of the surrounding environment is dark based on identifying that the user made a frowning face from the facial expression data 302, and increase the illumination of the lighting device among the external devices.

The wearable device 100 may identify that the user's eyes are bloodshot from the eye data 301, and determine that the user does not want to continue the activity that the user is currently performing based on identifying that the user made a tired face from the facial expression data 302, and decrease the illumination of the lighting device among the external devices.

Referring to FIG. 3B, the wearable device 100 may be implemented as a smart watch. The first sensor 120 according to various embodiments may include at least one of a heart rate sensor, an electrocardiogram sensor, and/or a blood pressure sensor. The user's biometric information may include at least one of heart rate or electrocardiogram data 303 or blood pressure data 304.

For example, the wearable device 100 may acquire the heart rate or electrocardiogram data 303 through the heart rate sensor or the electrocardiogram sensor. The wearable device 100 may acquire the blood pressure data 304 from the blood pressure sensor.

The wearable device 100 according to various embodiments may identify that the user's heart rate is greater than or equal to a threshold heart rate from the electrocardiogram data 303, and determine that the user is currently exercising and is feeling hot based on identifying that the user's blood pressure is greater than or equal to a threshold pressure from the blood pressure data 304, and decrease the temperature of the indoor space by controlling the air conditioning device among the external devices.

The wearable device 100 may identify that the user is closing his or her eyes for a threshold time or longer from the eye data 301, and determine that the user is sleeping based on identifying that the user's electrocardiogram is similar to the electrocardiogram corresponding to a sleeping state from the electrocardiogram data 303, and control the lighting device in a power saving mode among the external devices.

Figure 4:
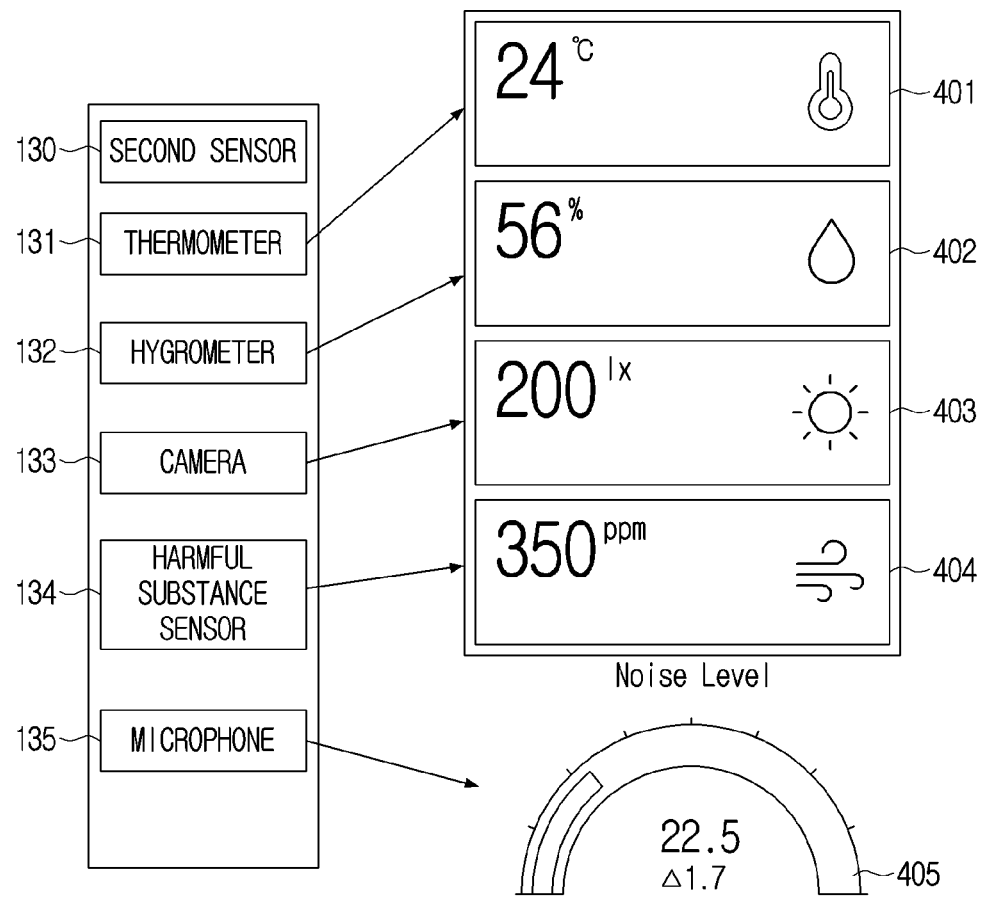
FIG. 4 is a diagram illustrating surrounding environment information according to various embodiments.

FIG. 4 is a diagram illustrating example surrounding environment information according to various embodiments.

According to FIG. 4, the second sensor 130 may include a thermometer 131, a hygrometer 132, a camera 133, a harmful substance sensor 134, and a microphone 135. Also, the camera 133 according to various embodiments may function as an illumination sensor.

The wearable device 100 according to various embodiments of the disclosure may respectively acquire temperature data 401 from the thermometer 131, humidity data 402 from the hygrometer 132, illumination data 403 from the camera 133, harmful substance concentration data 404 from the harmful substance sensor 134, and acoustic data 405 from the microphone 135.

The wearable device 100 according to various embodiments may identify that the temperature of the indoor space is higher than or equal to a threshold temperature from the temperature data 401, and decrease the temperature of the indoor space by controlling the air conditioning device among the external devices based on identifying that the humidity of the indoor space is greater than or equal to threshold humidity from the humidity data 402.

The wearable device 100 may determine that the user is not taking sleep based on the user's biometric information, and increase the illumination of the lighting device among the external devices based on identifying that the illumination of the indoor space is lower than or equal to threshold illumination from the illumination data 403.

The wearable device 100 may operate the air conditioning device among the external devices based on identifying that the concentration of the harmful substances distributed in the indoor space is greater than or equal to threshold concentration from the harmful substance concentration data 404, and decrease the volume of the acoustic device among the external devices based on identifying that the noise level of the indoor space is greater than or equal to a threshold level from the acoustic data 405.

Figure 5A:
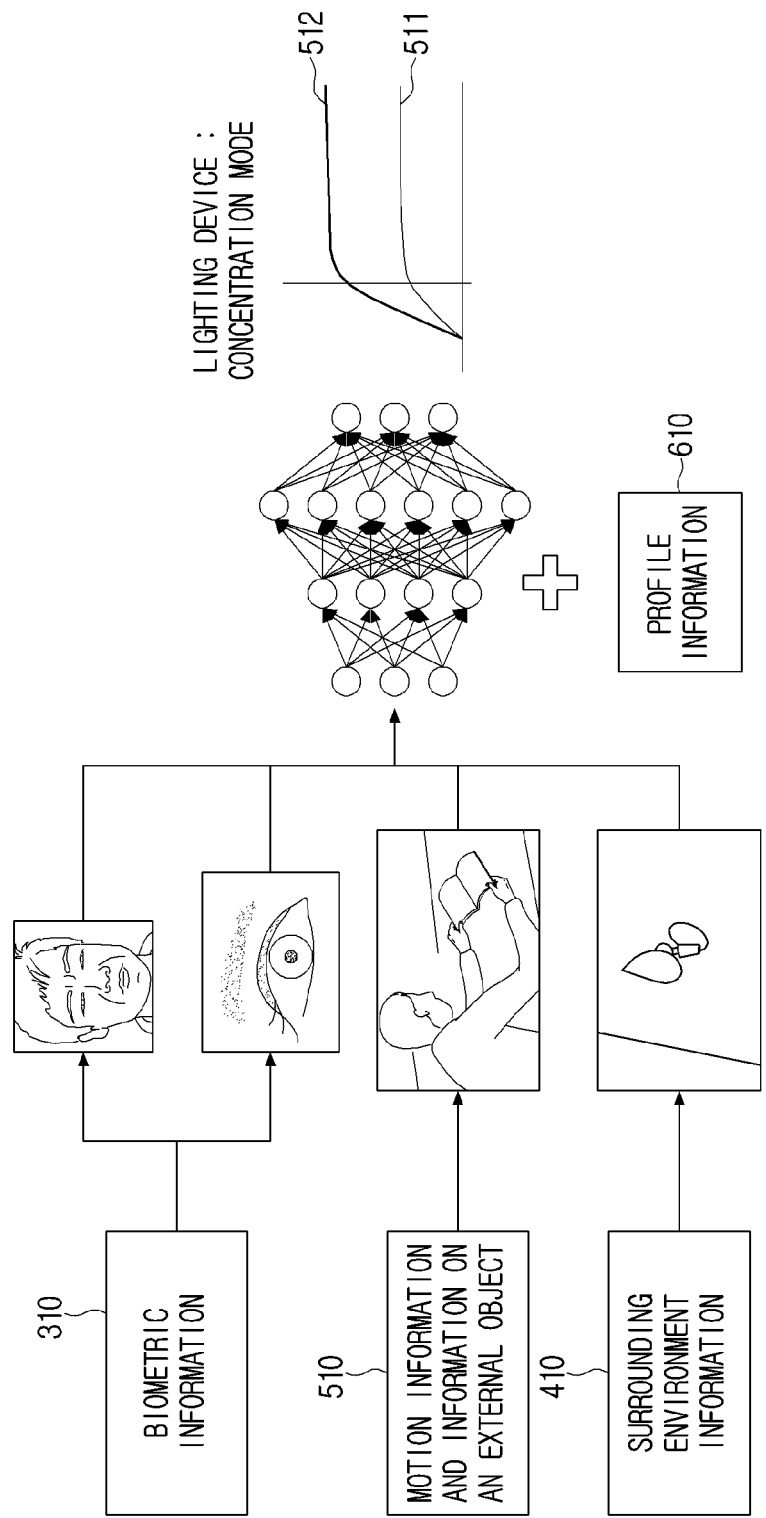
FIG. 5A, FIG. 5B and FIG. 5C are diagrams illustrating an example method of identifying a control mode according to various embodiments.
Figure 5B:
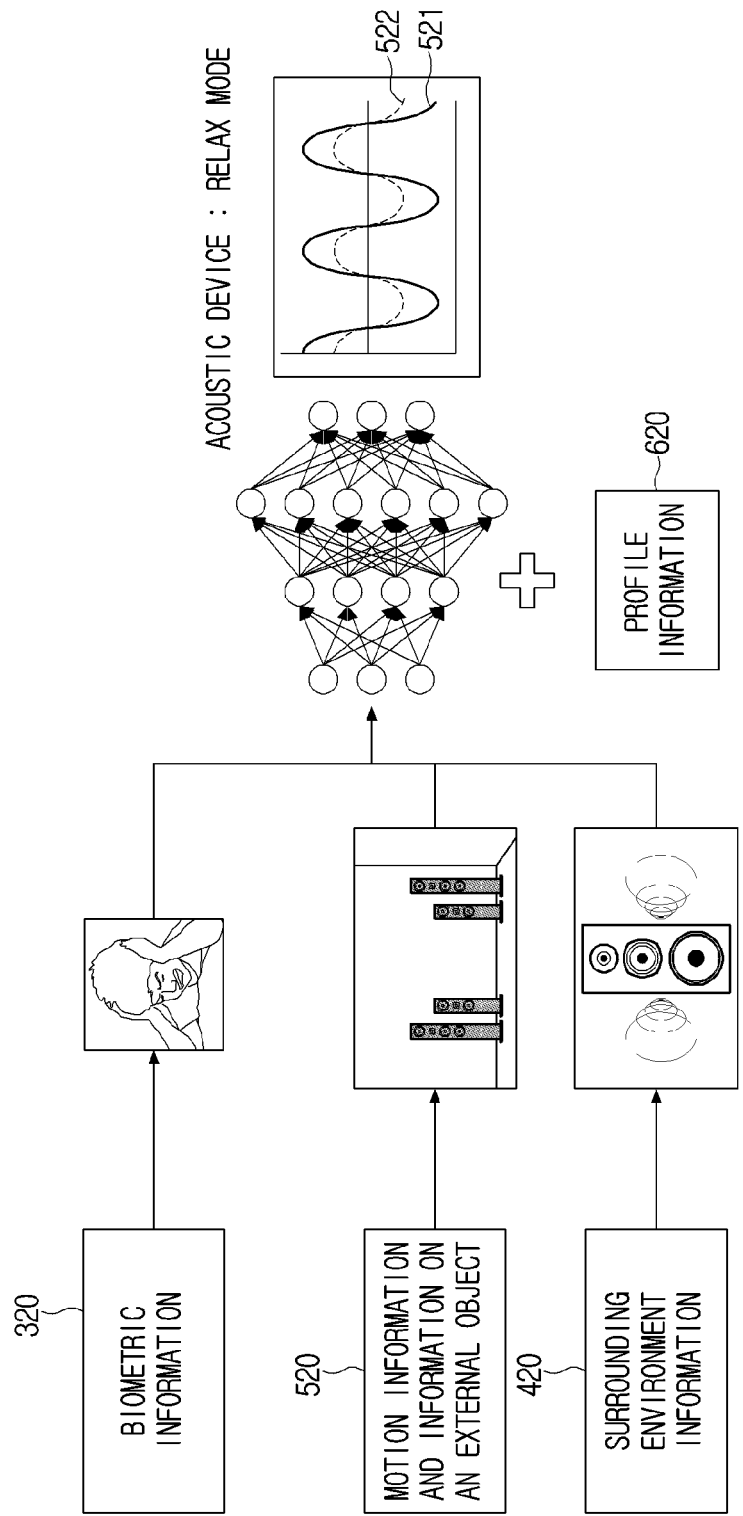
Figure 5C:
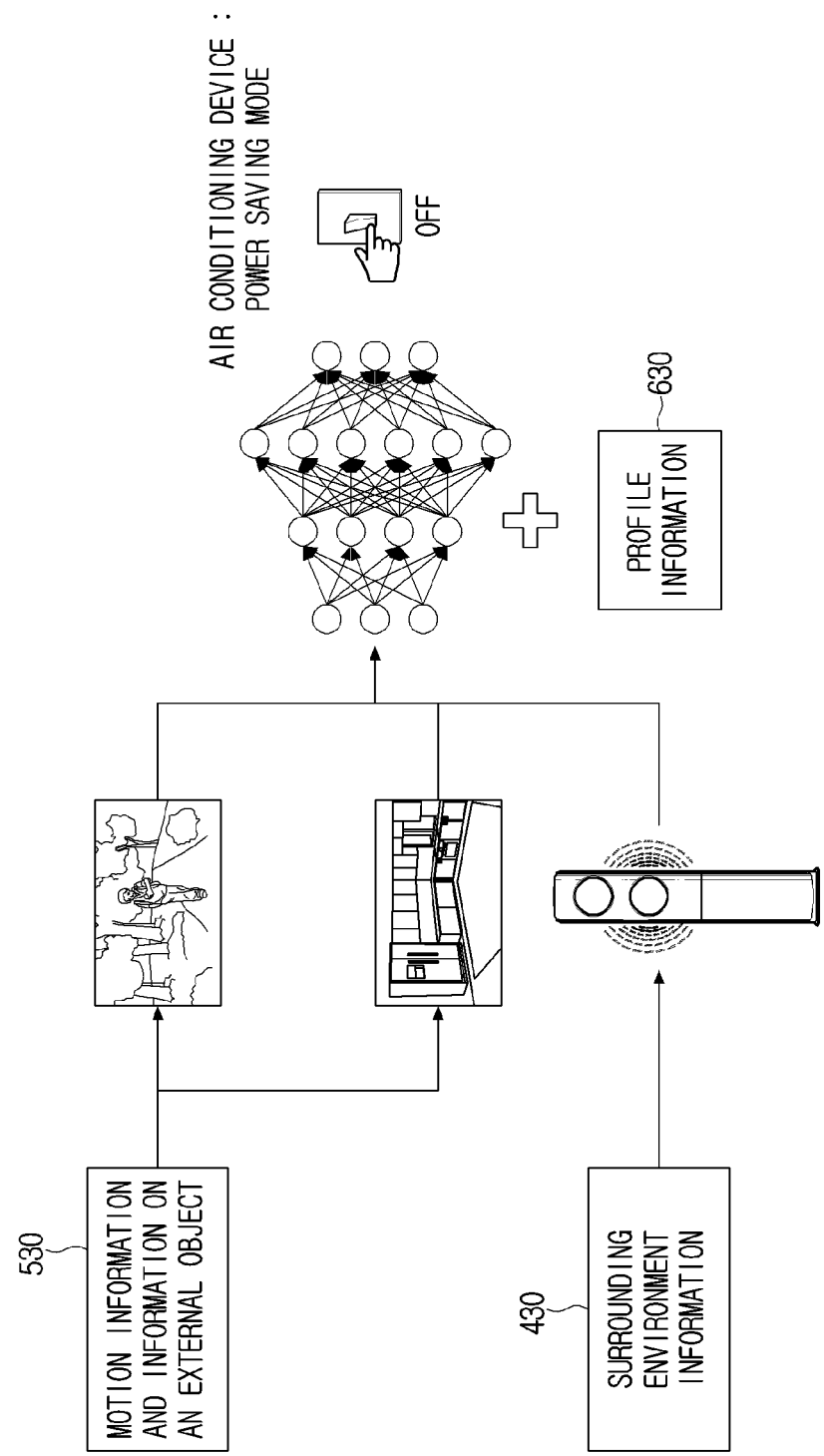

FIG. 5A, FIG. 5B and FIG. 5C are diagrams illustrating an example method of identifying a control mode according to various embodiments.

The wearable device 100 according to various embodiments of the disclosure may identify the control mode for the viewing environment of an AR content corresponding to at least one external device based on the user's biometric information, the surrounding environment information, the motion information, the external object information, and the profile information.

The wearable device 100 may further include a third sensor (e.g., a camera). The wearable device 100 according to various embodiments may acquire information on the user's motion and the external object related to the AR content through the third sensor, and input the acquired motion information and information on the external object into the neural network model, and acquire activity information related to the AR content.

Referring to FIG. 5A, the wearable device 100 may determine that the user is feeling that the illumination of the surrounding environment is dark based on the biometric information 310 acquired by the first sensor 120, and identify that the illumination of the indoor space is less than or equal to the threshold illumination based on the surrounding environment information 410 acquired by the second sensor 130.

The wearable device 100 may acquire activity information corresponding to 'reading' based on the motion information and the information 510 on the external object acquired through the third sensor. The wearable device 100 may identify the control mode for the at least one external device based on a result value that was output by inputting the biometric information 310, the surrounding environment information 410, and the activity information into the neural network model, and the user's profile information 610.

According to various embodiments, in case it is identified that the result value that was output by inputting the biometric information 310, the surrounding environment information 410, and the activity information into the neural network model has a numerical value corresponding to 'the concentration mode' of the lighting device among the at least one external device, and the frequency that the user used the lighting device in 'the concentration mode' is greater than or equal to a threshold numerical value based on the user's profile information 610, the wearable device 100 may control the lighting device that was operating in the previous illumination 511 to operate in the increased illumination 512.

Referring to FIG. 5B, the wearable device 100 may determine that the user is feeling that the noise in the surrounding environment is severe based on the biometric information 320 acquired by the first sensor 120, and identify that the noise level of the indoor space is greater than or equal to the threshold level based on the surrounding environment information 420 acquired by the second sensor 130.

The wearable device 100 may acquire activity information corresponding to 'music appreciation' based on the motion information and the information 520 on the external object acquired through the third sensor. The wearable device 100 may identify the control mode for the at least one external device based on a result value that was output by inputting the biometric information 320, the surrounding environment information 420, and the activity information into the neural network model, and the user's profile information 620.

According to various embodiments, in case it is identified that the result value that was output by inputting the biometric information 320, the surrounding environment information 420, and the activity information into the neural network model has a numerical value corresponding to 'the relax mode' of the acoustic device among the at least one external device, and there is no problem in the user's hearing based on the user's profile information 620, the wearable device 100 may control the acoustic device that was operating in the previous volume 521 to operate in the decreased volume 522.

Referring to FIG. 5C, the wearable device 100 may identify that the temperature of the indoor space is less than or equal to the threshold temperature based on the surrounding environment information 430 acquired by the second sensor 130.

The wearable device 100 may acquire activity information corresponding to 'taking a walk' based on the motion information and the information 530 on the external object acquired through the third sensor. For example, in case outdoor scenery is identified in the gazing direction of the user or a dynamic object is not identified in the indoor space, the wearable device 100 may acquire activity information corresponding to at least one activity that the user performs in the outdoor space. The third sensor according to various embodiments may be provided on at least one of the wearable device 100 or an external device located in the indoor space.

The wearable device 100 may identify the control mode for the at least one external device based on a result value that was output by inputting the surrounding environment information 430 and the activity information into the neural network model and the user's profile information 630.

According to various embodiments, in case it is identified that the result value that was output by inputting the surrounding environment information 430 and the activity information into the neural network model has a numerical value corresponding to 'the power saving mode' of the air conditioning device among the at least one external device, and the frequency that the user went out at the current time is greater than or equal to a threshold numerical value based on the user's profile information 630, the wearable device 100 may control the air conditioning device to operate in the power saving mode.

In the above, it was described that the wearable device 100 inputs the biometric information, the surrounding environment information, the motion information, and the external object information all at once into the neural network model. However, this is merely an example, and the wearable device 100 according to various embodiments may acquire information on the control mode for at least one device based on control recommendation information for each of the plurality of environmental elements that was acquired by inputting the biometric information and the surrounding environment information into the neural network model.

According to an embodiment, the wearable device 100 may identify a control mode for a viewing environment of an AR content based on the user's preference information acquired by inputting the user's biometric information into the neural network model, activity information acquired by inputting the user's motion information and information on an external object into the neural network model, and the surrounding environment information.

Figure 6:
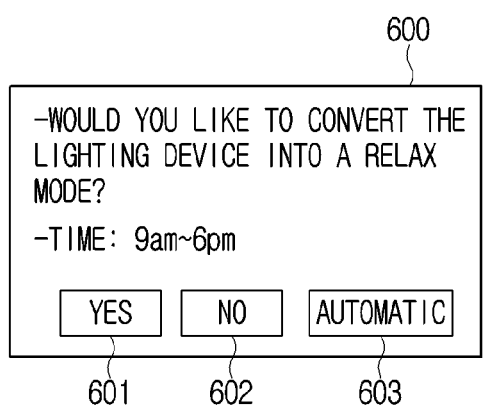
FIG. 6 is a diagram illustrating an example guide UI according to various embodiments.

FIG. 6 is a diagram illustrating an example guide UI according to various embodiments.

The wearable device 100 according to various embodiments may identify a control mode for a viewing environment of an AR content, and acquire control information for at least one external device related to the viewing environment based on the identified control mode. The wearable device 100 may provide a user interface (UI) guiding control of the at least one external device based on the acquired control information through the display 110.

According to various embodiments, the wearable device 100 may determine that there is a need to decrease the illumination of the indoor space, and acquire control information regarding a lighting device that may influence the user. Further, the wearable device 100 may provide a UI 600 guiding whether to convert the lighting device into a relax mode through the display 110. The UI 600 may include at least one of type information of the at least one external device, control time information for the at least one external device, or request information on the control authority for the at least one external device.

The user may input a user instruction for controlling the lighting device through the provided UI 600. For this, the display 110 may be implemented as a touch screen. Then, when the user instruction is input, the wearable device 100 may transmit a control signal for controlling the lighting device to the lighting device through the communication interface 140.

For example, the user may input a user instruction by selecting at least one of the items 601, 602, 603 included in the UI 600. For example, the user may input a user instruction for converting the lighting device into the relax mode from 9:00 a.m. to 6:00 p.m. by selecting the 'yes' item 601, or make the lighting device operate in the current state by selecting the 'no' item 602.

The user may input a user instruction making the wearable device 100 automatically control the lighting device without providing a separate UI afterwards regarding control of the lighting device, by granting control authority for the lighting device to the wearable device 100 by selecting the 'automatic' item 603.

Figure 7A:
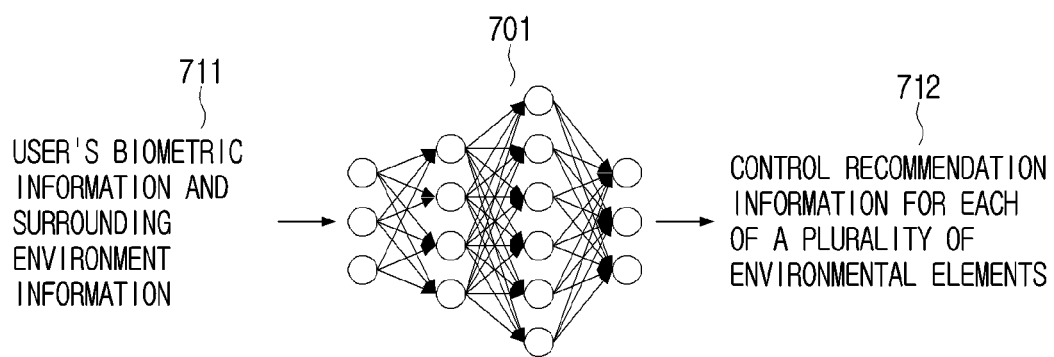
FIG. 7A, FIG. 7B and FIG. 7C are diagrams illustrating example neural network models according to various embodiments.
Figure 7B:
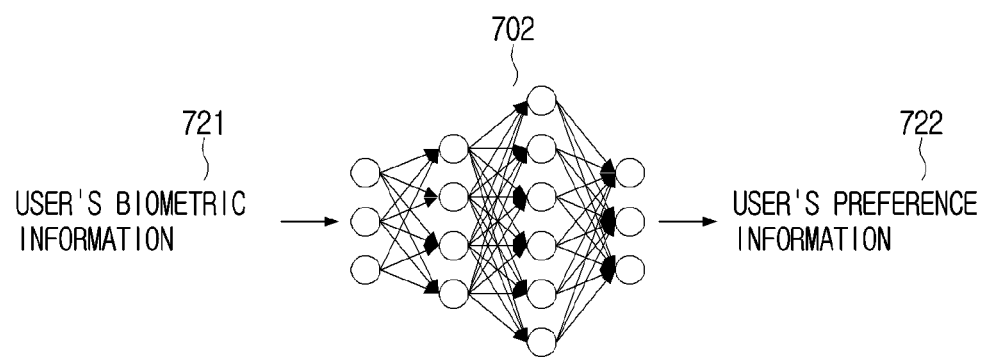
Figure 7C:
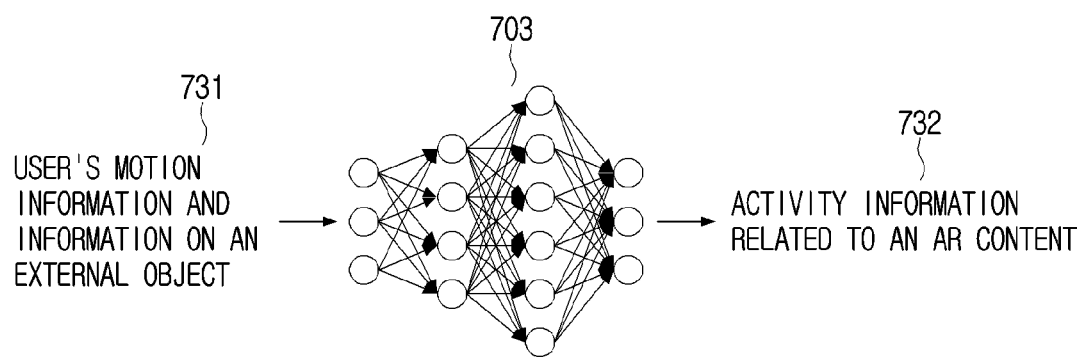

FIG. 7A, FIG. 7B and FIG. 7C are diagrams illustrating example neural network models according to various embodiments.

A neural network model may include a plurality of neural network layers. Each of the plurality of neural network layers has a plurality of weight values, and performs a neural network operation through the operation result of the previous layer and an operation among the plurality of weight values. The plurality of weight values included by the plurality of neural network layers may be optimized by the learning result of the neural network model. For example, the plurality of weight values may be updated such that a loss value or a cost value acquired at the neural network model during a learning process is reduced or minimized. An artificial neural network may include, for example, and without limitation, a deep neural network (DNN), and there are, for example, and without limitation, a convolutional neural network (CNN), a deep neural network (DNN), a recurrent neural network (RNN), a restricted Boltzmann Machine (RBM), a deep belief network (DBN), a bidirectional recurrent deep neural network (BRDNN), deep Q-networks, etc., but the disclosure is not limited to the aforementioned examples.

Referring to FIG. 7A, the first neural network model 701 may be a model that has been trained to receive input of the user's biometric information and the surrounding environment information 711, and output control recommendation information 712 for each of the plurality of environmental elements.

Referring to FIG. 7B, the second neural network model 702 may be a model that has been trained to receive input of the user's biometric information 721 and output the user's preference information 722.

Referring to FIG. 7C, the third neural network model 703 may be a model that has been trained to receive input of the user's motion information and the information 731 on the external object and output activity information 732 related to the AR content.

In the aforementioned example embodiments, it was described that the functions of the wearable device 100 utilizing each of the plurality of neural network models 701, 702, 703 refer to different embodiments, but the disclosure can be implemented in a form wherein at least some of these implementation examples are used complexly.

FIG. 8A and FIG. 8B are diagrams illustrating an example control method based on location information according to various embodiments.

The communication interfaces included in the wearable device 100 according to various embodiments of the disclosure and a plurality of external devices may include an ultra wide band (UWB) communication chip including UWB circuitry. UWB is a kind of wireless communication technologies for transmitting information of large capacity in low power across a very wide band (3.1-10.6 GHz) compared to a conventional spectrum. Also, UWB may be utilized in high speed transmission (480 Mbps at the maximum) of data between devices that are spaced apart by 10 m or more, and it may particularly be used for data communication among a plurality of Internet of Things (IoT) devices located in an indoor space.

The processor 150 provided on the wearable device 100 according to various embodiments of the disclosure may identity at least one external device related to a viewing environment of an AR content based on the location information of each of the plurality of external devices and the location information of the wearable device 100, and change the environment of the indoor space by controlling the identified external device. In particular, the processor 150 may identify the at least one external device related to the viewing environment of the AR content by a UWB method.

Referring to FIG. 8A, the wearable device 100 may identify that the user is reading a book around the desk 811, and acquire control recommendation information corresponding to 'increase of the illumination' based on the user's biometric information and the surrounding environment information. Further, the wearable device 100 may acquire information regarding 'the concentration mode' of the lighting devices L1, L2, L3, and control the lighting devices L1, L2, L3 such that the illumination of the indoor space is increased based on the acquired information.

The wearable device 100 according to various embodiments of the disclosure may identify a lighting device related to the viewing environment of the AR content based on at least one of the distance between the lighting device and the user, the power consumption of the lighting device, whether there is an obstacle (whether there is a direct visible ray) between the lighting device and the user, or the vector location from the wearable device 100.

For example, the wearable device 100 may identify that only the lighting device L1 around the desk 811 is an external device related to the viewing environment of the AR content, and identify that the lighting device L2 around the bed 812 and the lighting device L3 around the living room 813 are not related to the viewing environment of the AR content. The wearable device 100 may acquire only control information for the lighting device L1 around the desk 811, and transmit the acquired control information to the identified lighting device L1.

Referring to FIG. 8B, the wearable device 100 may identify that the user is sleeping around the bed 822. The viewing environment of the AR content corresponding to the case wherein the user is sleeping may be an environment wherein provision of the AR content has stopped, and in this case, the wearable device 100 may control at least one lighting device located in the indoor space in 'the power saving mode.'

The wearable device 100 according to various embodiments may identify that the lighting device L1 around the desk 821 and the lighting device L2 around the bed 822 are external devices related to the viewing environment of the AR content, and identify that the lighting device L3 around the living room 823 is not related to the viewing environment of the AR content. The wearable device 100 may acquire control information for the lighting device L1 around the desk 821, and the lighting device L2 around the bed 822, and transmit the acquired control information to the identified lighting devices L1, L2.

Through this, the wearable device 100 can control only the external devices related to the viewing environment of the AR content, and thus the operation amount of the processor 150 and the power consumption of the wearable device 100 can be reduced.

Figure 9:
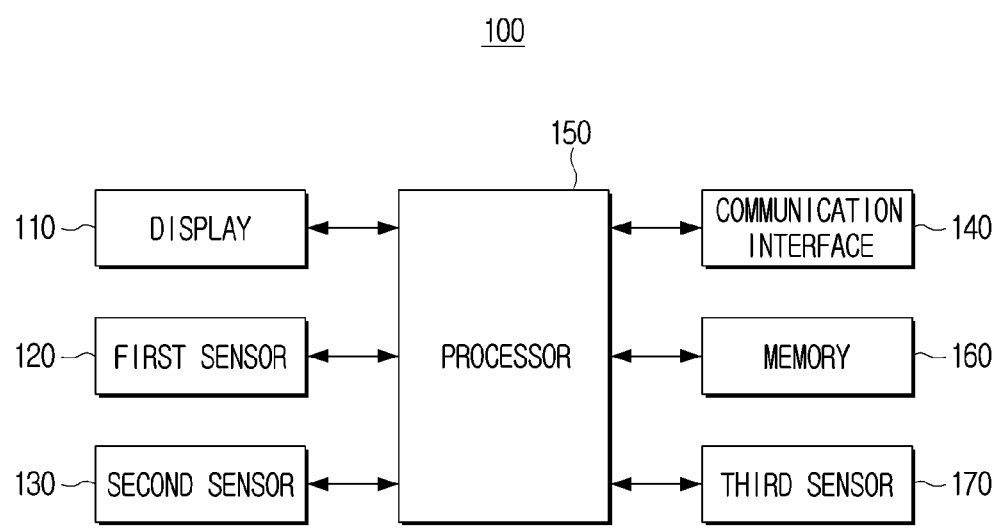
FIG. 9 is a block diagram illustrating an example configuration of a wearable device according to various embodiments.

FIG. 9 is a block diagram illustrating an example configuration of a wearable device according to various embodiments.

Referring to FIG. 9, the wearable device 100 may include a display 110, a first sensor 120, a second sensor 130, a communication interface (e.g., including communication circuitry) 140, a processor (e.g., including processing circuitry) 150, a memory 160, and a third sensor 170. Among the components illustrated in FIG. 9, regarding components that overlap with the components illustrated in FIG. 2, detailed explanation will be omitted.

The memory 160 may store data necessary for the various embodiments of the disclosure. The memory 160 may be implemented in the form of a memory embedded in the wearable device 100, or in the form of a memory that can be attached to or detached from the wearable device 100 according to the use of stored data. For example, in the case of data for operating the wearable device 100, the data may be stored in a memory embedded in the wearable device 100, and in the case of data for an extended function of the wearable device 100, the data may be stored in a memory that can be attached to or detached from the wearable device 100. Meanwhile, in the case of a memory embedded in the wearable device 100, the memory may be implemented as at least one of a volatile memory (e.g. a dynamic RAM (DRAM), a static RAM (SRAM), or a synchronous dynamic RAM (SDRAM), etc.) or a non-volatile memory (e.g. a one time programmable ROM (OTPROM), a programmable ROM (PROM), an erasable and programmable ROM (EPROM), an electrically erasable and programmable ROM (EEPROM), a mask ROM, a flash ROM, a flash memory (e.g. NAND flash or NOR flash, etc.), a hard drive, or a solid state drive (SSD)). Also, in the case of a memory that can be attached to or detached from the wearable device 100, it may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), and the like.

The memory 160 according to various embodiments of the disclosure may store at least one instruction and at least one neural network model. Meanwhile, the neural network model may have been stored in a separate server (not shown) that is not the wearable device 100. In this case, the processor 150 may control the communication interface 140 to transmit and receive data with the server storing the neural network model.

Functions related to the neural network model (referred to as artificial intelligence functions herein) among the functions of the wearable device 100 according to the disclosure are operated through the processor 150 and the memory 160. The processor 150 may include one or a plurality of processors. Here, the one or plurality of processors may be generic-purpose processors such as a CPU, an AP, a digital signal processor (DSP), etc., graphic-dedicated processors such as a GPU, a vision processing unit (VPU), etc., or artificial intelligence-dedicated processors such as a neural network processing unit (NPU). The one or plurality of processors 150 perform control to process input data according to predefined operation rules or a neural network model stored in the memory 160. Alternatively, in case the one or plurality of processors 150 are artificial intelligence-dedicated processors, the artificial intelligence-dedicated processors may be designed as a hardware structure specified for processing of a specific neural network model.

The predefined (e.g., specified) operation rules or the neural network model are characterized in that they are made through learning. Here, being made through learning may refer, for example, to a basic neural network model being trained using a plurality of learning data by a learning algorithm, and predefined operation rules or a neural network model set to perform desired characteristics (or, purposes) are thereby made. Such learning may be performed in a device itself wherein artificial intelligence functions are performed according to the disclosure, or performed through a separate server/system. As examples of learning algorithms, there are supervised learning, unsupervised learning, semi-supervised learning, or reinforcement learning, but learning algorithms in the disclosure are not limited to the aforementioned examples.

The third sensor 170 is a component including a sensor for acquiring a user's motion information and information on an external object related to an AR content. The processor 150 according to various embodiments may input the user's motion information and the information on the external object acquired through the third sensor 170 into the neural network model, and acquire activity information related to the AR content.

FIG. 10 is a flowchart illustrating an example method of controlling an electronic device according to various embodiments.

According to the method of controlling a wearable device according to various embodiments of the disclosure, an augmented reality content (AR) content may be provided through a display in operation S1010.

A control mode for a viewing environment of the AR content may be identified based on a user's biometric information acquired through the first sensor and surrounding environment information acquired through the second sensor in operation S1020.

Control information on at least one external device related to the viewing environment may be acquired based on the identified control mode in operation S1030.

A control signal for controlling the at least one external device may be transmitted to the external device based on the acquired control information in operation S1040.

In operation S1020 of identifying the control mode, the control mode for the viewing environment of the AR content may be identified based on the user's biometric information, the surrounding environment information, and the user profile information.

In operation S1040 of transmitting the control signal, a user interface (UI) configured to guide control of the at least one external device based on the acquired control information may be provided, and based on a user instruction for controlling the at least one external device being input through the UI, the control signal for controlling the at least one external device may be transmitted to the external device.

The UI may include at least one of type information of the at least one external device, control time information for the at least one external device, or request information on the control authority for the at least one external device.

The information on the control mode for the viewing environment of the AR content may be acquired by inputting the user's biometric information and the surrounding environment information into a first neural network model, and the first neural network model may have been trained to receive input of the user's biometric information and the surrounding environment information and output control recommendation information for each of a plurality of environmental elements.

In operation S1020 of identifying the control mode, the user's motion information and information on an external object related to the AR content may be acquired through the third sensor, and the control mode for the viewing environment of the AR content may be identified based on the user's biometric information, the surrounding environment information, the user's motion information, and the information on the external object.

In operation S1020 of identifying the control mode, the user's biometric information may be input into a second neural network model and the user's preference information may be acquired, and the user's motion information and the information on the external object may be input into a third neural network model and activity information related to the AR content may be acquired. The control mode for the viewing environment of the AR content may be identified based on the user's preference information, the activity information, and the surrounding environment information.

In operation S1030 of acquiring the control information, control information for the at least one external device related to the viewing environment may be acquired based on location information of each of a plurality of external devices and location information of the wearable device.

In operation S1030 of acquiring the control information, the external device may be identified by an ultra wide band (UWB) method, and the control information for the identified external device may be acquired.

The control mode may include at least one of a concentration mode, a relax mode, or a power saving mode.

Methods according to the aforementioned various embodiments of the disclosure may be implemented in forms of applications that can be installed on conventional wearable devices.

The methods according to the aforementioned various embodiments of the disclosure may be implemented just with software upgrade, or hardware upgrade of conventional wearable devices.

The aforementioned various embodiments of the disclosure may be performed through an embedded server provided on a wearable device, or at least one external server.

The aforementioned various embodiments may be implemented in a recording medium that can be read by a computer or a device similar to a computer, using software, hardware, or a combination thereof. In some cases, the embodiments described in this disclosure may be implemented as the processor 150 itself. According to implementation by software, the embodiments such as procedures and functions described in this disclosure may be implemented as separate software modules. Each of the software modules can perform one or more functions and operations described in this disclosure.

Computer instructions for performing processing operations of the wearable device 100 according to the aforementioned various embodiments of the disclosure may be stored in a non-transitory computer-readable medium. Computer instructions stored in such a non-transitory computer-readable medium make the processing operations at the wearable device 100 according to the aforementioned various embodiments performed by a specific machine, when the instructions are executed by the processor of the specific machine.

A non-transitory computer-readable medium refers to a medium that stores data semi-permanently, and is readable by machines. As specific examples of a non-transitory computer-readable medium, there may be a CD, a DVD, a hard disc, a blue-ray disc, a USB, a memory card, a ROM and the like.

While various example embodiments of the disclosure have been illustrated and described, the disclosure is not limited to the aforementioned example embodiments, and it will be apparent to those skilled in the art that various modifications may be made, without departing from the gist of the disclosure including the appended claims. Further, it is intended that such modifications are not to be interpreted independently from the technical idea of the disclosure. It will also be understood that any of the embodiment(s) described herein may be used in conjunction with any other embodiment(s) described herein.

What is claimed is:

1. A wearable device comprising:
a display;
a first sensor;
a second sensor;
a third sensor;
a communication interface comprising communication circuitry;
at least one processor comprising processing circuitry; and
a memory storing instructions which, when executed individually and/or collectively by the at least one processor, control the electronic device to:
provide augmented reality (AR) content through the display,
acquire preference information by inputting biometric information acquired through the first sensor into a second neural network model,
acquire activity information by inputting motion information and information on external object acquired through the third sensor into a third neural network model,
identify a control mode for a viewing environment of the AR content based on the preference information, the activity information, and surrounding environment information acquired through the second sensor,
acquire control information on at least one external device related to the viewing environment based on the identified control mode, and
transmit a control signal for controlling the at least one external device to the external device through the communication interface based on the acquired control information,
wherein the control mode includes a concentration mode or a power saving mode, the biometric information includes eye data of the user or facial expression data of the user and the surrounding environment information includes information of temperature, humidity, illumination, or a harmful substance of the user's surrounding environment.

2. The wearable device of claim 1,
wherein the memory stores user profile information and
wherein the instructions, when executed individually and/or collectively by the at least one processor, control the electronic device to:
identify the control mode for the viewing environment of the AR content based on the biometric information, the surrounding environment information, and the stored user profile information.

3. The wearable device of claim 1,
wherein the instructions, when executed individually and/or collectively by the at least one processor, control the electronic device to:
control the display to provide a user interface (UI) configured to guide control of the at least one external device based on the acquired control information, and
based on an instruction for controlling the at least one external device being input through the UI, transmit the control signal for controlling the at least one external device to the external device through the communication interface.

4. The wearable device of claim 3,
wherein the UI comprises:
at least one of type information of the at least one external device, control time information for the at least one external device, or request information on the control authority for the at least one external device.

5. The wearable device of claim 1,
wherein the information on the control mode for the viewing environment of the AR content is acquired by inputting the biometric information and the surrounding environment information into a first neural network model, and wherein the first neural network model has been trained to receive input of the biometric information and the surrounding environment information and output control recommendation information for each of a plurality of environmental elements.

6. The wearable device of claim 1, wherein the instructions, when executed individually and/or collectively by the at least one processor, control the electronic device to:

identify the at least one external device related to the viewing environment based on location information of each of a plurality of external devices and location information of the wearable device.

7. The wearable device of claim 6, wherein the communication interface comprises:

an ultra wide band (UWB) communication chip comprising UWB circuitry, and wherein the instructions, when executed individually and/or collectively by the at least one processor, control the electronic device to:

identify the external device by a UWB method.

8. The wearable device of claim 1, wherein the control mode comprises:

at least one of a concentration mode or a power saving mode.

9. A method of controlling a wearable device, the method comprising:

providing augmented reality (AR) content through a display;

acquiring preference information by inputting biometric information acquired through the first sensor into a second neural network model;

acquiring activity information by inputting motion information and information on external object acquired through the third sensor into a third neural network model;

identifying a control mode for a viewing environment of the AR content based on the preference information, the activity information, and surrounding environment information acquired through the second sensor;

acquiring control information on at least one external device related to the viewing environment based on the identified control mode; and transmitting a control signal for controlling the at least one external device to the external device based on the acquired control information, wherein the control mode includes a concentration mode or a power saving mode, the biometric information includes eye data of the user or facial expression data of the user and the surrounding environment information includes information of temperature, humidity, illumination, or a harmful substance of the user's surrounding environment.

10. The method of claim 9, wherein the identifying the control mode comprises:

identifying the control mode for the viewing environment of the AR content based on the biometric information, the surrounding environment information, and the user profile information.

11. The method of claim 9, wherein the transmitting the control signal comprises:

providing a user interface (UI) configured to guide control of the at least one external device based on the acquired control information; and based on an instruction for controlling the at least one external device being input through the UI, transmitting the control signal for controlling the at least one external device to the external device.

12. The method of claim 11, wherein the UI comprises:

at least one of type information of the at least one external device, control time information for the at least one external device, or request information on the control authority for the at least one external device.

13. The method of claim 9, wherein the information on the control mode for the viewing environment of the AR content is acquired by inputting the biometric information and the surrounding environment information into a first neural network model, and wherein the first neural network model has been trained to receive input of the biometric information and the surrounding environment information and output control recommendation information for each of a plurality of environmental elements.

* * * * *